United States Patent [19]
Nakano et al.

[11] Patent Number: 6,094,220
[45] Date of Patent: *Jul. 25, 2000

[54] IMAGE PICKUP APPARATUS WITH IMAGE EXTRACTING UNIT

[75] Inventors: Norihiko Nakano, Fujisawa; Ryuji Nishimura; Yasushi Takagi, both of Yokohama, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/797,084

[22] Filed: Feb. 10, 1997

[30] Foreign Application Priority Data

Feb. 8, 1996 [JP] Japan .................................. 8-022631

[51] Int. Cl.$^7$ ...................................................... H04N 9/73
[52] U.S. Cl. ............................................ 348/223; 348/222
[58] Field of Search .................................... 348/222, 223, 348/224, 225, 226, 227, 228, 229; H04N 9/73

[56] References Cited

U.S. PATENT DOCUMENTS

| | | |
|---|---|---|
| 4,797,733 | 1/1989 | Takagi et al. . |
| 5,170,247 | 12/1992 | Takagi et al. . |
| 5,177,599 | 1/1993 | Takagi et al. . |
| 5,270,802 | 12/1993 | Takagi et al. . |
| 5,347,371 | 9/1994 | Nishimura et al. . |
| 5,412,487 | 5/1995 | Nishimura et al. . |
| 5,617,141 | 4/1997 | Nishimura et al. . |
| 5,644,359 | 7/1997 | Ito ........................................... 348/223 |

*Primary Examiner*—Tuan Ho
*Attorney, Agent, or Firm*—Antonelli, Terry, Stout & Kraus, LLP

[57] ABSTRACT

An image pickup apparatus including an image extracting unit and performing an image extraction process and automatic feedback control of white balance for executing image extraction with high accuracy by performing the image extraction process and automatic white balance control with reference to each other.

8 Claims, 4 Drawing Sheets

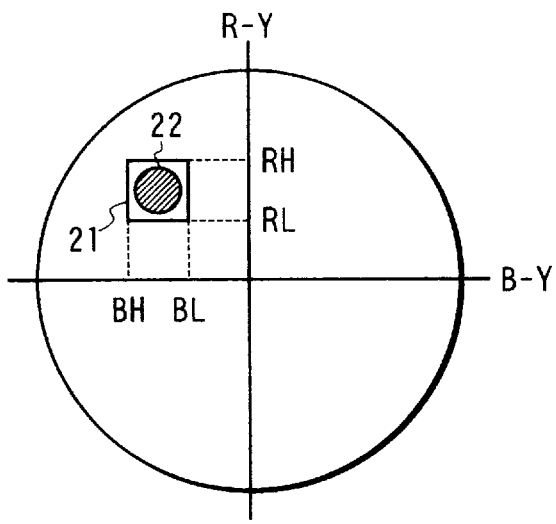
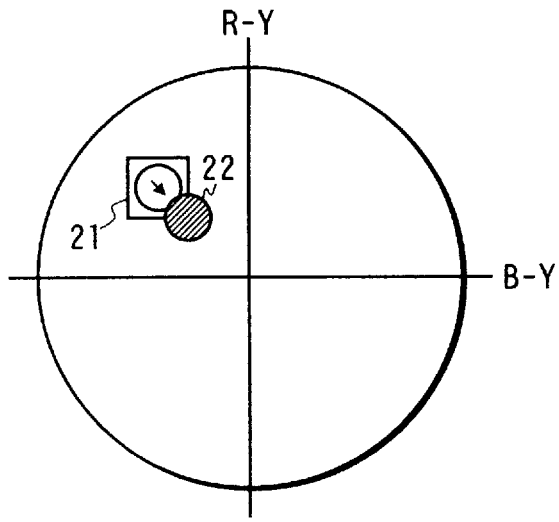
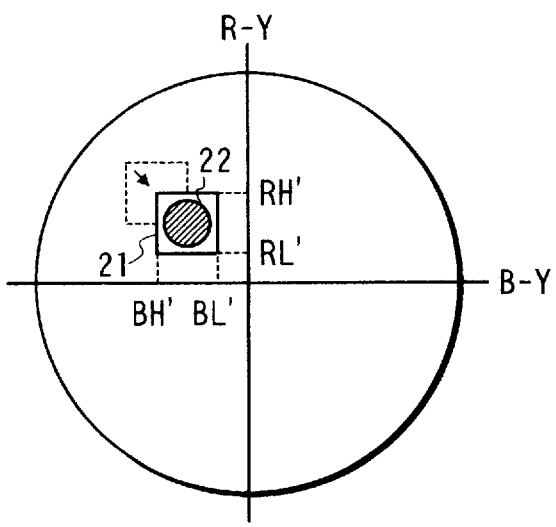

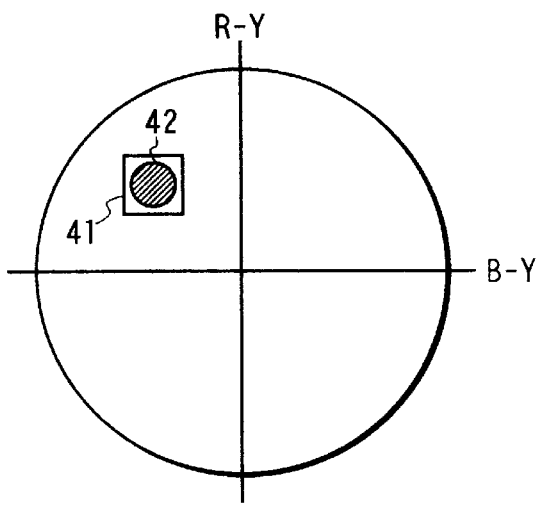 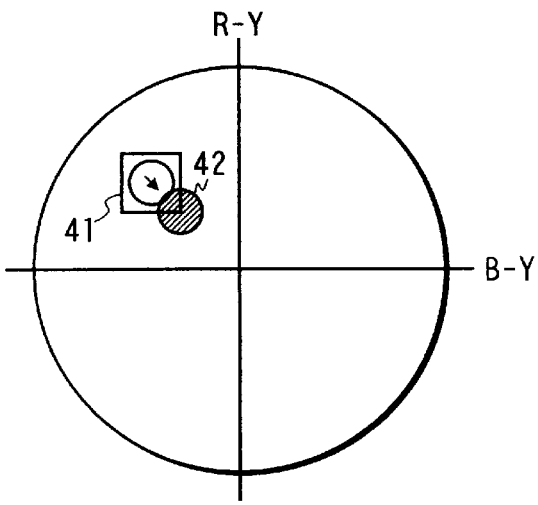
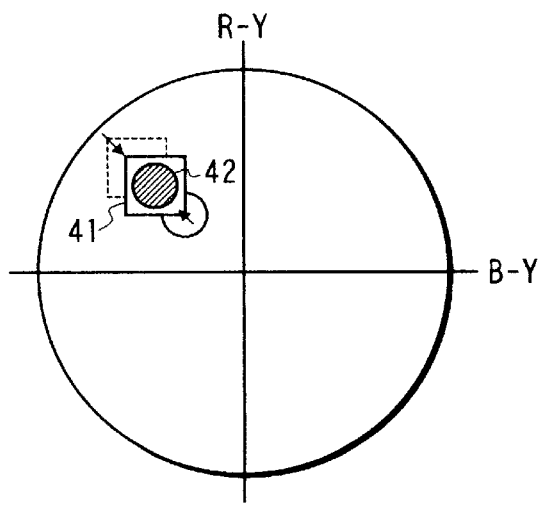

IMAGE PICKUP APPARATUS WITH IMAGE EXTRACTING UNIT

BACKGROUND OF THE INVENTION

1. Field of the Invention

The present invention relates to an image pickup apparatus comprising an image extracting unit and particularly to an image pickup apparatus for performing an image extraction process and automatic feedback control of white balance.

2. Description of the Related Art

Regarding the image extraction process, Japanese Patent Application Laid-Open No. 225328/1994, which corresponds to U.S. Pat. No. 5,412,487, describes the stable extraction of an object, depending on the extracting condition on a standardized color difference plane, by standardizing a color difference signal with a luminance signal.

In regard to automatic white balance control, Japanese Patent Application Laid-Open No. 344530/1993 describes performance of automatic white balance control with higher accuracy by utilizing an intelligent algorithm recognizing the image pickup environment.

However, the feedback type automatic white balance control generates a malfunction by erroneously judging as white a color approximated to an achromatic color when a small amount of white is included in an image, resulting in change of a degree of color saturation and hue of the image picked up. As a result, it becomes difficult in the image extraction process for extracting an object on the standardized color difference plane to extract the object with high accuracy due to a change of distribution of the object on the standardized color difference plane.

SUMMARY OF THE INVENTION

It is therefore an object of the present invention to overcome the above-described problems and to execute image extraction with higher accuracy by performing the image extraction process and automatic white balance control with reference to each other.

In accordance with the present invention, an image pickup apparatus comprises an image pickup unit for picking up an image, a signal processor for processing a signal obtained by the image pickup unit, an image extracting unit for extracting an object, and a controller for controlling the image pickup unit, signal processor and image extracting unit.

In accordance with a feature of the present invention, the controller performs the control in accordance with a relationship between the image extraction process by the image extracting unit and the automatic white balance control by the signal processor.

Other objects and advantages of the present invention will be apparent from the following detailed description of the presently referred embodiments thereof, which description should be considered in conjunction with the accompanying drawings in which:

BRIEF DESCRIPTION OF THE DRAWINGS

FIGS. 2(a)–2(c) show standardized color difference plane diagrams for explaining the control operation of an image pickup apparatus in relation to a second embodiment of the present invention;

FIGS. 4(a)–4(c) show standardized color difference plane diagrams for explaining the control operation of an image pickup apparatus in relation to a fourth embodiment of the present invention.

DESCRIPTION OF THE PREFERRED EMBODIMENTS

Figure 1:
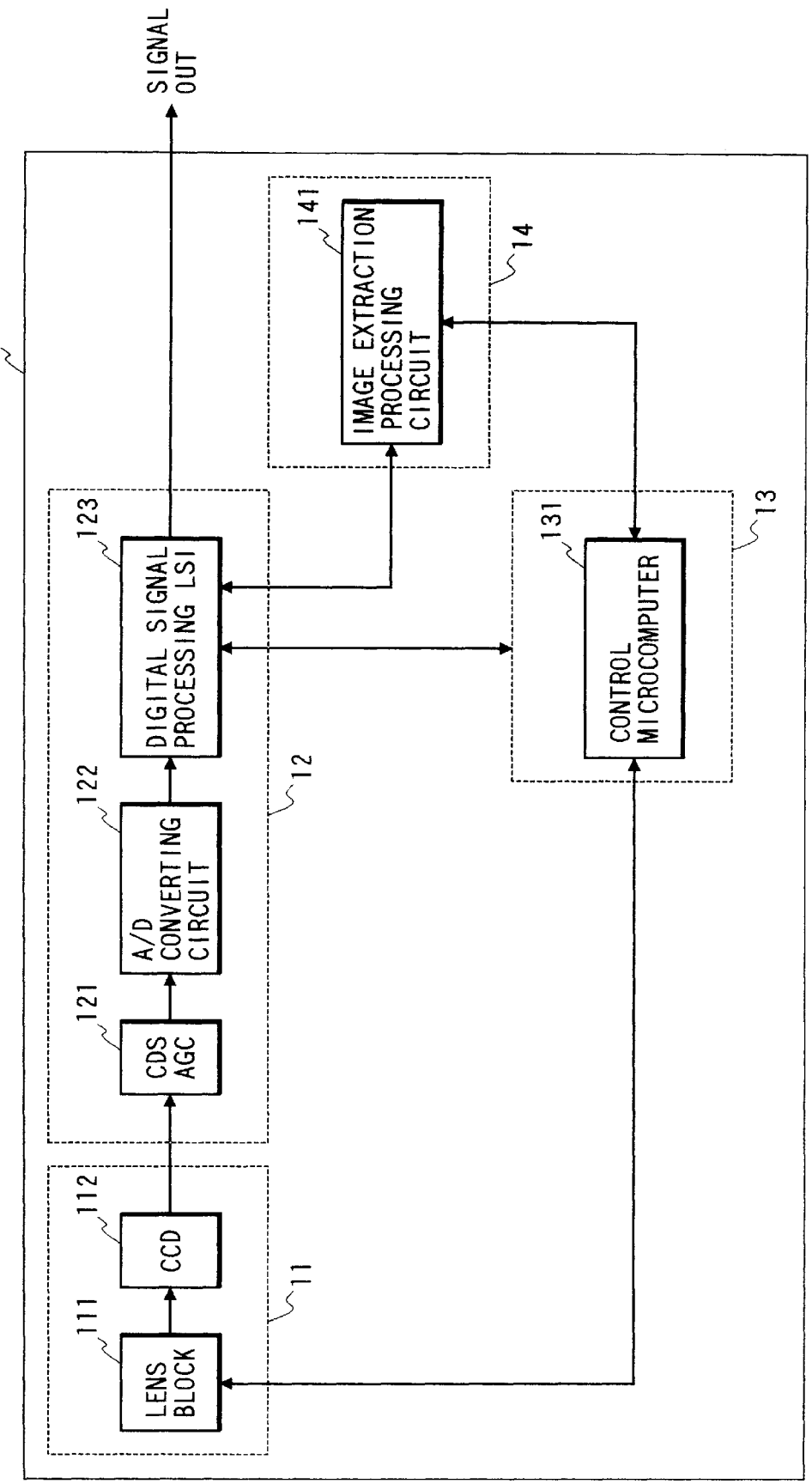
FIG. 1 is a block diagram of an image pickup apparatus providing an image extracting function in relation to the a first embodiment of the present invention.

FIG. 1 is a block diagram of an image pickup apparatus providing an image extracting function in relation to a first embodiment of the present invention wherein an image pickup apparatus 1 having an image extracting function includes an image pickup unit 11, a signal processor 12, a controller 13 and an image extracting unit 14.

The image pickup unit 11 includes a lens block 111 which performs automatic focus control, automatic iris control and zoom control or the like and an image pickup element 112 which converts light having passed the lens block 111 into an electrical signal. The signal processor 12 includes a CDSAGC (Correlated Double Sampling Automatic Gain Control) circuit 121 for eliminating noise from an image signal obtained from the image pickup element 112 and for amplifying signal gain, an A/D converting circuit 122 for converting the signal obtained from the CDSAGC circuit 121 into a digital signal, and a digital signal processing LSI 123 for executing the signal processings such as automatic white balance control, electronic zoom control or the like on the image signal obtained from the A/D converting circuit 122. The controller 13 includes a control microcomputer 131 for performing various arithmetic processings to control the lens block 111, digital signal processing LSI 123 and the image extraction unit 14. The image extraction unit 14 includes an image extraction processing circuit 141 for standardizing a color difference signal with a luminance signal to extract an object depending on the extracting condition on the standardized color difference plane.

According to a first embodiment, the control microcomputer 131 detects the state of the image extraction processing circuit 141, and the control microcomputer 131 suspends or inhibits the operation of the automatic white balance control of digital signal processing LSI 123 when an image is being extracted by the image extraction processing circuit 141.

As explained above, extraction of an object can be performed with higher accuracy depending on the extracting condition on the standardized color difference plane by inhibiting operation of the automatic white balance control during the image extraction processing and thereby avoiding occurrence of a malfunction due to the automatic white balance control.

According to the present invention, the image pickup apparatus of FIG. 1 is utilized for other embodiments as explained below, wherein the control microcomputer 131 performs different control.

FIGS. 2(a)–2(c) respectively show standardized color difference plane diagrams and are utilized to explain the operation in accordance with a second embodiment. Numeral 21 designates an object extracting condition which is set under the desired hue and degree of color saturation and numeral 22 designates a distribution of chromaticity of the object on the standardized color difference plane. When the automatic white balance control is performed by the digital signal processing LSI 123 during extraction of the object in the image extraction processing circuit 141, due to a malfunction of the automatic white balance control, the hue and degree of saturation change from the desired condition. As a result, the distribution 22 of chromaticity of the object on the standardized color difference plane changes as shown in FIG. 2(b). Under the distribution 22 of chromaticity of the object and extracting condition 21 as shown in FIG. 2(b), it is difficult to extract the object with high accuracy. Therefore, when the automatic white balance control of digital signal processing LSI 123 is performed during image extraction by the image extraction processing circuit 141, in accordance with the second embodiment, the control microcomputer 131 controls the image extraction processing circuit 141 to update the extracting condition of the image extraction processing circuit 141 based on an updating condition of automatic white balance control of the digital signal processing LSI 123 as shown in FIG. 2(c).

Color difference signals R-Y and B-Y can be obtained, depending on the following formulae (1) and (2), from the primary color signals R, G, B generated by the digital signal processing LSI 123.

$$R-Y = 0.70R - 0.59G - 0.11B \quad (1)$$

$$B-Y = -0.30R - 0.59G + 0.89B \quad (2)$$

Substituting (X1, Y1) and (X2, Y2) in formulae (1), and (2), formulae (3)–(6) are obtained.

$$RL = 0.70RX1 - 0.59GX1 - 0.11BX1 \quad (3)$$

$$BL = -0.30RY1 - 0.59GY1 + 0.89BY1 \quad (4)$$

$$RH = 0.70RX2 - 0.59GX2 - 0.11BX2 \quad (5)$$

$$BH = -0.30RY2 - 0.59GY2 + 0.89BY2 \quad (6)$$

Therefore, when the primary extracting conditions of image extraction processing circuit 141 on the standardized color difference plane are given by the above formulae (3) to (6), the conditions are set by (RL, BL), (RH, BH) as shown in FIG. 2(a).

Next, when the gain adjustment is performed on the primary color signals R, B through the automatic white balance control of the digital signal processing LSI 123, the standardized color difference signals R-Y and B-Y can be obtained as indicated by the formulae (7) and (8).

$$R-Y' = 0.70R(1+r) - 0.59G - 0.11B(1+b) \quad (7)$$

$$B-Y' = -0.30R(1+r) - 0.59G + 0.89B(1+b) \quad (8)$$

Here, r and b indicate an amount of compensation of the primary colors R and B. Substituting (X1, Y1) and (X2, Y2) in formulae (7) and (8), formulae (9)–(12) are obtained.

$$RL' = 0.70RX1(1+r) - 0.59GX1 - 0.11BX1(1+b) = (0.70RX1 - 0.59GX1 - 0.11BX1) + (0.70RX1r - 0.11BX1b) = RL + (0.70RX1r - 0.11BX1b) \quad (9)$$

$$BL' = -0.30RY1(1+r) - 0.59GY1 + 0.89BY1(1+b) = (-0.30RY1 - 0.59GY1 + 0.89BY1) + (-0.30RY1r + 0.89BY1b) = BL + (-0.30RY1r + 0.89BY1b) \quad (10)$$

$$RH' = 0.70RX2(1+r) - 0.59GX2 - 0.11BX2(1+b) = (0.70RX2 - 0.59GX2 - 0.11BX2) + (0.70RX2r - 0.11BX2b) = RH + (0.70RX2r - 0.11BX2b) \quad (11)$$

$$BH' = -0.30RY2(1+r) - 0.59GY2 + 0.89BY2(1+b) = (-0.30RY2 - 0.59GY2 + 0.89BY2) + (-0.30RY2r + 0.89BY2b) = BL + (-0.30RY2r + 0.89BY2b) \quad (12)$$

The new or updated extracting conditions of image extraction processing circuit 141 (RL', BL'), (RH', BH') consider the gain adjustment due to the automatic white balance control of digital signal processing LSI 123 as indicated by the above formulae (9) to (12). Therefore, the control microcomputer 131 controls the image extraction processing circuit 141 based on the update condition as shown in FIG. 2(c) of automatic white balance control of the digital signal processing LSI 123 in accordance with the formulae (9) to (12).

As described above, according to the second embodiment, when the automatic white balance control is performed during extraction of the object, extraction of the object can be obtained with high accuracy by updating the extracting conditions of the image extraction processing circuit 141 under the control of the microcomputer 131 as shown.

Figure 3A:
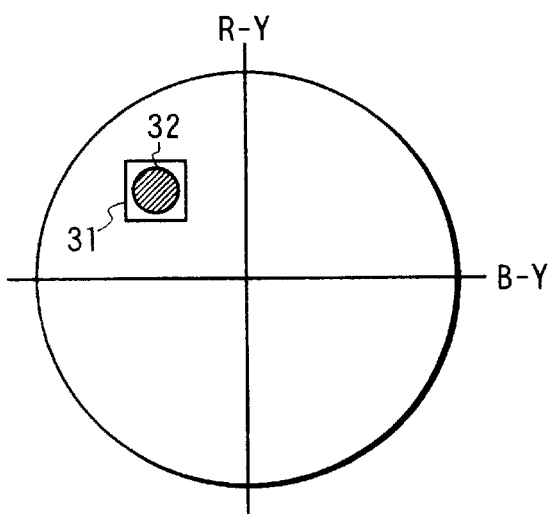
FIGS. 3(a)–3(c) show standardized color difference plane diagrams for explaining the control operation of an image pickup apparatus in relation to a third embodiment of the present invention.

Next, a third embodiment of the present invention will be explained with reference to FIGS. 3(a)–3(c) which respectively show standardized color difference plane diagrams. Numeral 31 designates an object extracting condition which is set under the desired hue and degree of color saturation and numeral 32 designates distribution of chromaticity of the object on the standardized color difference plane as shown in FIG. 3(a).

When a color temperature of a light source changes in an image, the distribution of chromaticity of the object on the standardized color difference plane 32 also changes. In this case, the control microcomputer 131 controls the distribution of chromaticity of the object on the standardized color difference plane 32 so as to return to the initial condition of the automatic white balance control, when the color temperature of a light source changes. This operation is a feature of automatic white balance control.

Figure 3B:
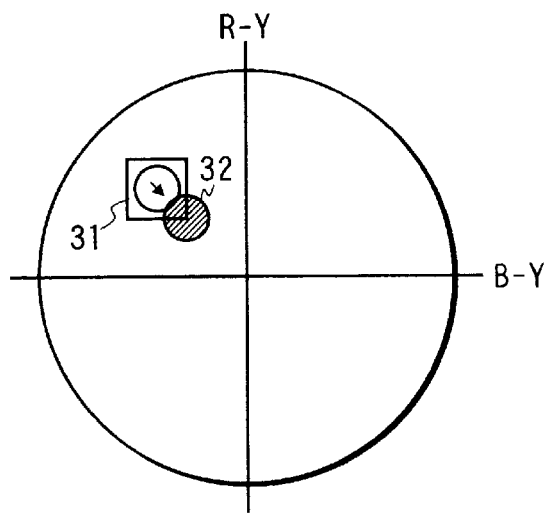

However, when a constant object exists in the image and such object is continuously extracted such as in an operation of tracking the object, the automatic white balance control of the digital signal processing LSI 123 is considered to generate a malfunction if the distribution 32 of chromaticity of object on the standardized color difference plane has changed as shown in FIG. 3(b).

Figure 3C:
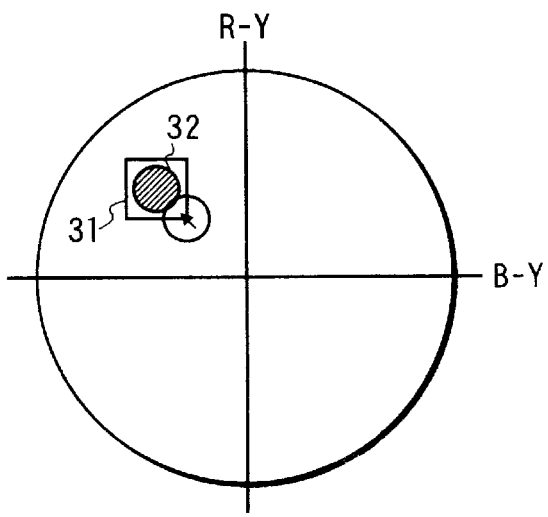

Therefore, the control microcomputer 131 controls the image extraction processing circuit 141 so as to continue extracting an image based on the last extracting condition of image extraction processing circuit 141, so that the distribution 32 of chromaticity does not change on the standardized color difference plane of the object as shown in FIG. 3(c). Accordingly, the extraction of the object is performed with high accuracy by performing the automatic white balance control based on the last extracting condition under control of the microcomputer 131.

A fourth embodiment of the present invention will be explained with reference to FIGS. 4(a)–4(c) which respectively show standardized color difference plane diagrams. In these figures, numeral 41 designates an object extracting condition which is set under the desired hue and degree of color saturation and numeral 42 designates distribution of chromaticity of the object on the standardized color difference plane as shown in FIG. 4(a).

As in the case of the third embodiment, it is assumed that distribution 42 of object has changed due to malfunction of the automatic white balance control as shown in FIG. 4(b). In this embodiment, the control microcomputer 131 effects control so that the extracting condition 41 of the image extraction processing circuit 141 is updated, as shown in FIG. 4(c), based on the automatic white balance control in a manner corresponding to the control performed in the second embodiment and moreover the automatic white balance control is compensated based on the image extracting conditions of the image extraction processing circuit 141 in a manner corresponding to the control performed in the third embodiment. Thus, extraction of the object can be performed with high accuracy by updating the extracting condition with reference to the automatic white balance control and executing such automatic white balance control by making reference to the image extraction processing.

According to the present invention, as described above, when the automatic white balance is controlled during extraction of object, the automatic white balance can be controlled by making reference to the image extraction processing and the extracting condition can be updated by making reference to the automatic white balance control in the image pickup apparatus providing the image extracting function. Thereby, it is now possible to extract the object with high accuracy, considering the automatic white balance control.

Although preferred embodiments of the present invention have been described and illustrated, it will be apparent to those skilled in the art that various modifications may be made without departing from the principles of the invention.

What is claimed is:

1. An image pickup apparatus comprising:

an image pickup unit which converts an optical image into an image signal;

a signal processor which processes the image signal from the image pickup unit, the signal processor performing automatic white balance control on the image signal;

an image extracting unit which extracts an object by extracting a portion of the image signal representing the object; and a controller which controls the signal processor and the image extracting unit so as to enable accurate extraction of the object while substantially preventing a malfunction in the extraction of the object due to performance of the automatic white balance control during the extraction of the object;

wherein the controller controls the signal processor to inhibit the automatic white balance control during the extraction of the object by the image extracting unit.

2. An image pickup apparatus comprising:

an image pickup unit which converts an optical image into an image signal;

a signal processor which processes the image signal from the image pickup unit, the signal processor performing automatic white balance control on the image signal;

an image extracting unit which extracts an object by extracting a portion of the image signal representing the object; and a controller which controls the signal processor and the image extracting unit so as to enable accurate extraction of the object while substantially preventing a malfunction in the extraction of the object due to performance of the automatic white balance control during the extraction of the object;

wherein the controller effects control by updating an extracting condition of the image extracting unit in accordance with the automatic white balance control performed by the signal processor when the signal processor performs the automatic white balance control during the extraction of the object by the image extracting unit.

3. An image pickup apparatus according to claim 2, wherein the image extracting unit extracts the object using a distribution of chromaticity of the object; and wherein the controller updates an extracting condition of the distribution of chromaticity of the object.

4. An image pickup apparatus comprising:

an image pickup unit which converts an optical image into an image signal;

a signal processor which processes the image signal from the image pickup unit, the signal processor performing automatic white balance control on the image signal;

an image extracting unit which extracts an object by extracting a portion of the image signal representing the object; and a controller which controls the signal processor and the image extracting unit so as to enable accurate extraction of the object while substantially preventing a malfunction in the extraction of the object due to performance of the automatic white balance control during the extraction of the object;

wherein the controller effects control by controlling the automatic white balance control performed by the signal processor in accordance with the extraction of the object by the image extracting unit when the signal processor performs the automatic white balance control during the extraction of the object by the image extracting unit.

5. An image pickup apparatus according to claim 14, wherein the controller further effects control by updating an extracting condition of the image extracting unit in accordance with the automatic white balance control performed by the signal processor.

6. An image pickup apparatus according to claim 5, wherein the image extracting unit extracts the object using a distribution of chromaticity of the object;

wherein the controller updates an extracting condition of the distribution of chromaticity of the object; and wherein the controller controls the automatic white balance control performed by the signal processor in accordance with a distribution of chromaticity of the extracted object.

7. An image pickup apparatus according to claim 4, wherein the image extracting unit extracts the object using a distribution of chromaticity of the object; and wherein the controller controls the automatic white balance control performed by the signal processor in accordance with a distribution of chromaticity of the extracted object.

8. An image pickup apparatus comprising:

an image pickup unit which converts an optical image into an image signal and provides an output thereof;

a signal processor which processes the image signal outputted from the image pickup unit, the signal processor performing automatic white balance control on the image signal;

an image extracting unit which extracts a portion of the image signal representing an object; and a controller which controls the signal processor and the image extracting unit;

wherein the controller controls the signal processor to inhibit the automatic white balance control during the extraction of the portion of the image signal representing the object by the image extracting unit.

* * * * *